Figure 1:
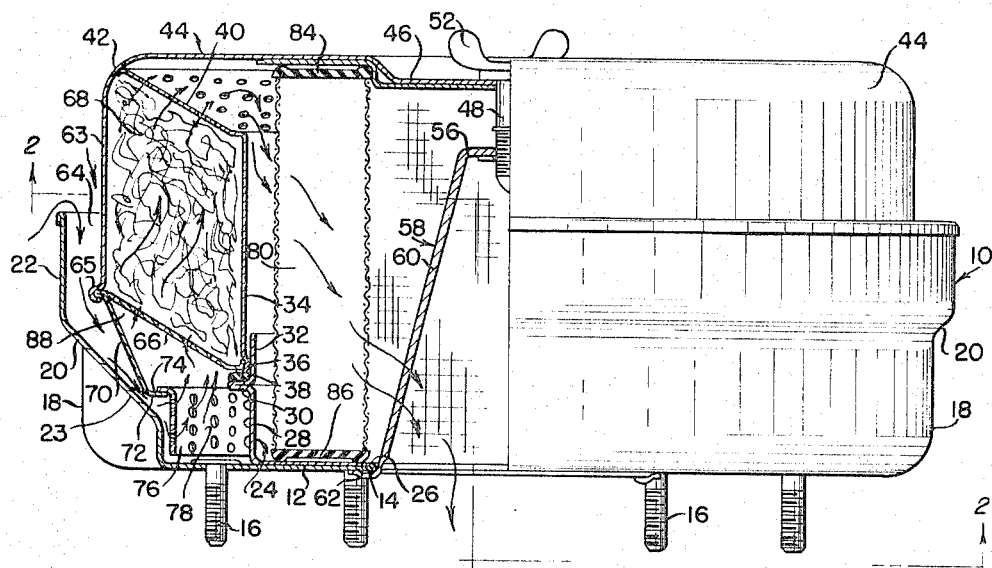

Jan. 17, 1967     H. R. SOBECK     3,298,149
COMBINATION OIL BATH AND DRY AIR FILTER
FOR INTERNAL COMBUSTION ENGINE
Filed March 9, 1964

INVENTOR.
HAROLD R. SOBECK
BY Strauck, Nolan & Neale
ATTORNEYS

3,298,149
COMBINATION OIL BATH AND DRY AIR FILTER FOR INTERNAL COMBUSTION ENGINE
Harold R. Sobeck, Novelty, Ohio, assignor to Rockwell-Standard Corporation, a corporation of Delaware
Filed Mar. 9, 1964, Ser. No. 350,354
5 Claims. (Cl. 55—252)

The present invention refers to filtering or purifying devices for air, gases or vapors and more particularly to air filtering devices especially adapted for use with internal combustion engines.

In the operation of internal combustion engines, the air drawn into the manifold to be mixed with the combustion fluid must be as clean as possible and should not contain even traces of minute particles of dirt ordinarily found in the atmosphere. Unfiltered air damages the engine in a short time, reduces engine performance and produces exhaust gases which are extremely dirty.

Air filters which have been used heretofore with internal combustion engines are of two main types, the dry filter and the oil bath filter. For a better understanding of the present invention, a short description of the functioning of these filters will be necessary.

Dry filters are in general equipped with a removable cartridge of a filter media which may be resin impregnated paper, cloth, non-woven cloth, felt, etc. The efficiency of these dry filters is extremely high and increases as the dirt-cake build-up on the filter media adds to the fineness of filtration. However, the dirt build-up, on the other hand, is detrimental to the proper functioning of the filter in that air flow is increasingly restricted, causing power loss and/or engine smoking thus making frequent servicing or replacement of the cartridge imperative.

Oil bath filters usually comprise an oil sump at the bottom of the filter housing and a wire mesh filter above the oil sump. As the air enters the filter, it is drawn through the oil in which a pre-cleaning scrubbing action takes place which removes most of the larger dirt particles. As the air moves from the oil upward and through the filter element, the remaining minute particles of dirt are trapped and retained by the wire mesh. At the same time, oil is drawn from the sump by the ascending air flow and is thrown against the filter element thereby continuously washing the filter element to remove the dirt deposited thereon by the air flow. This self-cleaning action together with the high dirt holding capacity assures a long life between service periods. However, this type of filter also has disadvantages among which is the reduction in filtering efficiency at reduced engine speed because of the reduced rate and velocity of air flow. Further, no warning is given of ineffective cleaning. Ineffective cleaning may occur at a low oil level or excessive dirt load. In addition, an undesirable condition may occur when the filter is not properly serviced. When the dirt settles on the bottom of the oil sump, the oil level is gradually raised at a rate depending on existing dirt conditions until the level reaches a point where oil pull-over takes place. When this occurs, the air coming out of the filter contains both dirt and oil which causes immediate engine damage. Thus, constant periodical service is of vital importance to assure proper functioning of the oil bath filter.

From the above, it will be seen that either of the two filter types are only as effective as their degree of care and servicing and it is known that filter servicing is neglected by many vehicle operators. In some extreme cases, the operator will purposely perforate the cartridge or element when it becomes clogged to restore air flow and thereby restore engine power or he will remove the filter cartridge altogether. Both actions may cause immediate engine damage.

For the above reasons and to increase the filter capacity, especially under severe dirt loads, so-called pre-cleaners have been proposed of which the centrifugal and cyclone types are the more commonly known. These pre-cleaner units function to reduce the dirt load on the main filter elements and are especially effective when used with dry filters, thereby considerably increasing the life of the dry-type filter elements. However, there again are certain disadvantages connected with the use of pre-cleaners. For example, they will be of no use when the main filter element is clogged or perforated. The additional cost and increased size of the filter unit, especially when it is of the centrifugal or cyclone type, is another disadvantage which restricts the use of pre-cleaners to a few particular applications.

Two-stage dry filters have also been proposed consisting of two individual filter elements in which only the outer element needs servicing. Although highly efficient and fool-proof to a certain degree when properly serviced, here again the usefulness of the filter is dependent on regular service and availability of replacement parts.

For these reasons, continuing efforts have been made to develop an effective filter which is fool-proof, does not need frequent periodic servicing, and is not larger than any conventional filter.

The present invention provides such a filter by combining in a unique manner an oil bath filter having a high dirt holding capacity and long service life, with a dry filter having a high efficiency to insure a high degree of air filtration at all times. More specifically, the present invention provides a combination oil bath and dry filter contained within the same unit so constructed that the air is first directed into the oil bath filter and from there through the dry filter element to remove the minute dirt particles not trapped by the oil filter.

Another object is the provision of an air filter for an internal combustion engine in which the air is directed first through an oil bath, from there into a wire mesh element which is continuously washed by oil carried in the flow of air, then through a dry filter element to remove the remnants of dirt from the air not trapped by the oil bath filter.

Still another object resides in the provision of a filter unit provided with deflector baffles in the entrance channel by which part of the entering air will be directed to flow through an oil bath and thereafter through a wire mesh filter element provided with slanted surfaces to allow oil entrained by the air to drain off back into the oil bath.

A further object is the provision of a combination oil bath and dry filter in which the air coming through the oil bath flows longitudinally through a wire mesh filter element assuring that no oil will be carried by the air into the dry filter element, the wire mesh filter element being constantly washed by oil entrained in the air and so constructed as to insure that excess oil drains back into the oil bath.

A still further object of the present invention is the provision of a combination oil bath and dry filter in which the oil bath filter is the pre-cleaner and is positioned radially around the dry filter so that the entire unit is no higher than any conventional oil bath or dry air filter.

Another object is to provide a combination oil bath and dry air filter which satisfies the requirements for high efficiency, high dust capacity and which has prolonged life and nominal, reasonable pressure drop.

Figure 2:
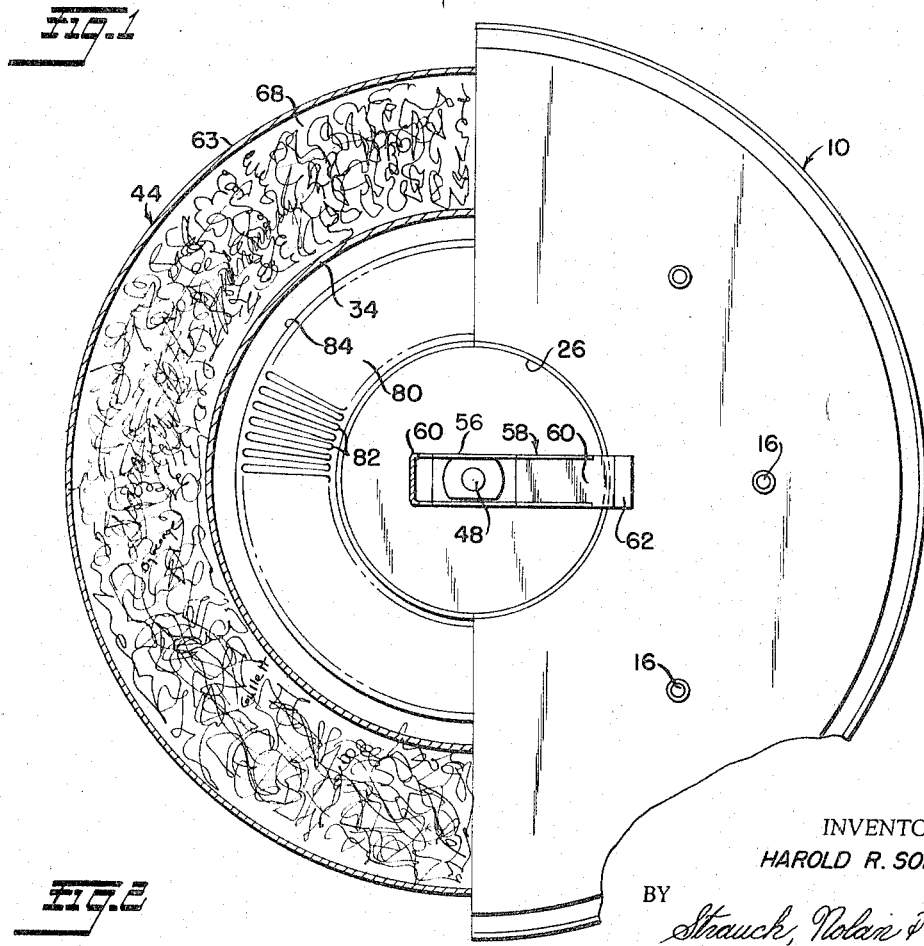

Other objects and novel features will become evident or especially be pointed out in the following detailed description taken in connection with the attached drawings and in which:

FIGURE 1 is an elevation partly in section of a filter unit according to the present invention; and FIGURE 2 is a section through part of the filter in FIGURE 1 along line 2—2 thereof.

With further reference to the drawings, a main structural component of the filter is an outer bowl 10 having a horizontal bottom surface 12 provided with a large central aperture 14 forming the air outlet. In assembled position the bottom 12 of bowl 10 is adapted to be secured to a component structure (not shown) by means of studs 16 extending from the bottom surface and the outlet aperture 14 will be suitably connected to an air intake pipe (not shown), all of which is conventional and well known in the art.

From the bottom surface 12 the side of the bowl 10 extends vertically upwards for a short distance as at 18 and then expands outwardly at an angle of approximately 45° to the vertical as at 20 for a distance sufficient to provide the desired unit diameter. At that point the side surface of the bowl extends again vertically upwards as at 22. At spaced intervals the bottom of the bowl 10 is provided with inwardly directed depressions 23, which are continuations of the slanted sides 20, for a purpose to appear.

Attached to the inside of the bottom 12 and concentric therewith is an inner bowl 24 of considerably smaller diameter and height than outer bowl 10 and provided with a central aperture 26 congruent with aperture 14. The upper part of the side wall 28 of the inner bowl 24 has a radial horizontal flange 30 which is folded back upon itself to continue again in vertical upward direction at 32.

A sleeve 34 is positioned around the upper part 32 of the inner bowl 24 in close proximity therewith and is supported on the flange 30 by means of flange 36. An airtight seal 38 is clamped between the two flanges 30 and 36 for a purpose to appear. The sleeve 34 extends upwardly and at its upper end extends outwardly to form a perforated conical portion 40 and the outer edge of which is attached at 42 to the inside of a cover 44 in the form of an inverted cup.

The cover 44 carries a plate 46 attached at its center to a clamping bolt 48. The outer end of the bolt 48 has a wing nut 52 and the inner end is threaded into the bridge portion 56 of a two legged support 58, the legs 60 of which extend downwardly and outwardly and are provided with flanges 62 extending under the inner and outer bowl assembly 10. Thus the bowl and cover 44 may be firmly assembled and held together at their common center to form a unitary structure by means of the support 58 and bolt 48.

The sidewall 63 of the cover 44 extends downwardly a short distance into the bowl 10 but sufficiently spaced apart from the upper wall portion 22 of the bowl 10 to conform an annular opening 64 between the adjoining walls of the cover and bowl to provide an air inlet passage.

Attached to the lower edge 65 of the cover 44 is a perforated baffle ring 66 which extends downwardly at an angle and is attached at its inner margin to the radial flange 36 of sleeve 34. A first filter element 68, which per se may be a conventional oil bath wire mesh filter, is contained between the side wall 63 of the cover, the inner sleeve 34, and the perforated bottom and top baffles 66 and 40, respectively, allowing air to pass in vertically through the filter element.

Attached to the same lower edge 65 of the cover 44 is a solid inclined baffle or deflector 70 which extends downwardly to a point 72 close to the depression 23 which restricts the air passage 64 at this location to a narrow gap. The bottom edges of the deflector 70 extend inwardly as at 74 to provide a support for a perforated grill 76. Grill 76 extends downwardly into the lower portion of the outer bowl 10, which, in operation, is filled with oil to a level indicated at 78 so that the lower part of the grill 76 extends into the oil.

A second, dry filter element 80 is retained between the cover 44 and the bottom 12 of the outer bowl 10. The filter element 80 is preferably a pleated, resin-impregnated paper or some other similar filter material and is positioned between the first filter element 68 and the air outlet aperture 14 in bowl 10. The pleats 82 (FIGURE 2) of the filter element 80 are closed off and held together at the top and bottom, by sealing rings 84 and 86, respectively, which, when the outer bowl 10 and cover 44 are clamped together by means of the wing nut 52 are brought into tight sealing engagement with the abutting bowl and cover surfaces to prevent any air from by-passing the filter. The filter element 80 is separated from the surrounding oil by the inner bowl 24; by the seal 38 and by the bowl extension 32 and sleeve 34 to prevent any oil from passing through to the filter element when the filter is shaken during running of the engine and motion of the vehicle.

It will be appreciated that, due to the nested construction of the filter elements 68 and 80, the size of the unit is considerably smaller than other known filter units employing a pre-cleaner and has approximately the same volume and capacity as a conventional oil bath cleaner alone. The oil bath provides the necessary high efficiency, high dust capacity requirement to satisfactorily act as a pre-cleaner for the filter element.

In operation air enters the filter unit through the circumferential air inlet at 64 between the bowl 10 and the cover 44 and is directed downward toward the oil by the deflector 70. This forces the air downward to the oil level. However, the perforated metal grill 76 allows the majority of the air to bypass the oil and go directly into the first filter element 68 through the perforated baffle 66 behind the deflector 70. The seal 38 prevents the air from bypassing the first filter element.

The remaining part of the air, which is deflected into the oil, goes through the oil and causes some of it to be washed up and carried with the air stream into the first filter element 68 through the perforations of the baffle 66. Most of the oil entrained by the airstream is trapped in the perforations and the continuous air flow causes the oil to fleck off the perforations. Since the baffle 66 slopes downwardly toward the inside, the oil drains on the inside back into the oil sump. Furthermore, because the deflector 70 is also sloped inwardly, a low pressure zone is created around the underside of the filter element in the corner area between the deflector 70 and the baffle 66 indicated at 88, which further helps in causing the oil to drain back onto the perforated metal grill 76 to be re-entrained by the incoming airstream. These features are very important in causing most of the oil to drain off the element 68 before the oil rises too far in the element and is pulled through the dry filter element 80.

The oil carried by the air and which is not drained off by the baffle 66 will be carried by the air in the form of droplets onto and partly into the filter element 68, thus continuously washing the filter 68 and freeing the air from most dirt particles. Then the air leaves the filter element 68 through the upper baffle 40 at the top of the filter.

The air coming out of the first filter element is then oil free and approximately 98% of the dirt has been removed.

The air flow is then directed into the space between the first filter element 68 and the second filter element 80 and into the second filter element. If the air passed only through the restricted space between the filter elements 68 and 80, an undesirably high pressure drop would occur. However, since the filter media of the filter 80 is pleated as seen in FIGURE 2, the space defined by the area between the pleats 82 forms an additional air passage thus substantially reducing the pressure drop. The pleat spacing then determines the volume and pressure of air flow through the filter 80 which can be adjusted to suit different requirements.

After passing through the dry filter element 80, the air, which is now substantially 100% clean, leaves the filter through the outlet aperture 14 to enter an air inlet pipe for an engine or the like (not shown).

At the infrequent intervals when replacement of the dry filter element 80 becomes necessary, the top cover 44 is removed by loosening the bolt 48. When the cover is so removed, the filter element may be lifted vertically from the lower bowl 10 and replaced with a new filter after which the cover is re-installed. It will be noted also that removal of the top cover carries with it the outer filter element 68, the baffle 70 and the perforated grid 76, thus exposing the oil chamber for periodic cleaning or for replacement of the oil.

Thus, the present invention provides an effective, compact air filtering unit which needs relatively little servicing except for an occasional oil change and the unit is so constructed that both oil bath and dry element will be serviced at the same time.

The filter unit of the present invention when serviced properly will not become clogged at any time. Thus, a constant volume of air at a substantially constant pressure is passed through the filter.

By determining the proper proportion between the oil bath and the dry type filter element, a long life and a reasonable pressure drop is assured.

The present invention may be embodied in other forms without departing from the spirit and essential characteristics thereof. Therefore, the present embodiment is to be considered in all respects as illustrative only and not restrictive, the scope of the present invention being indicated by the appended claims rather than by the foregoing description.

What is claimed is:

1. An air filter comprising a bottom cover having a bottom wall with a central air outlet passage, a top cover detachably secured to said bottom cover, the outer margins of said covers being spaced apart to provide an annular air inlet passage, means forming an annular oil chamber in said bottom cover adjacent the outer periphery thereof, means forming an annular vertical air passage extending upwardly from said oil chamber within said top cover, an annular inclined perforated baffle extending across said air passage over said oil chamber, an oil bath filter element supported on said baffle, a portion of the oil in said chamber being entrained and passed to said filter element for collection on said baffle and return to said oil chamber, and an annular dry filter element positioned radially within said oil bath filter element and extending from said bottom cover to said top cover between the upper end of said vertical air passage and said air outlet passage, the height of said dry filter element being essentially equal to the combined height of said oil chamber and said oil bath filter element.

2. The combination according to claim 1, together with a perforated cylindrical rim extending upwardly from the lower portion of said oil chamber to the region above the level of oil in said chamber to provide a passage for air passing through said filter above the oil in said chamber.

3. The combination according to claim 2 together with means forming circumferentially spaced restrictions in said air passage between said inlet and said rim to provide local acceleration of the air passing therethrough to increase the entrainment of oil in said air.

4. An air filter comprising a bottom cover having a bottom wall with a central air outlet passage, a top cover detachably secured to said bottom cover, the outer margins of said covers being spaced apart to provide an annular air inlet passage, means forming an annular oil chamber in said bottom cover adjacent the outer periphery thereof, means forming an annular vertical air passage extending upwardly from said oil chamber essentially to the top of said filter, an annular oil bath filter element extending radially across the full width of said vertical air passage, and an annular dry filter element positioned radially within said vertical air passage and said oil bath filter element and extending essentially from top to bottom of said filter between the upper end of said vertical air passage and said air outlet passage, the height of said dry filter element being essentially equal to the combined height of said oil chamber and said oil bath filter element.

5. The combination according to claim 4, together with annular seals provided between the upper and lower ends of said dry filter element and the top and bottom covers, respectively.

References Cited by the Examiner

UNITED STATES PATENTS

| Re. 21,272 | 11/1939 | Hallerberg. |
| 2,083,649 | 6/1937 | Heglar. |
| 2,287,806 | 6/1942 | Kamrath _____ 55—246 |
| 2,843,216 | 7/1958 | Powell _____ 55—259 X |
| 2,871,976 | 2/1959 | Sebok _____ 55—276 |
| 2,947,381 | 8/1960 | Cook et al. _____ 55—252 |

FOREIGN PATENTS

| 730,175 | 1/1943 | Germany. |
| 842,964 | 8/1960 | Great Britain. |

ROBERT F. BURNETT, *Primary Examiner.*

DANIEL K. DENENBERG, *Assistant Examiner.*